United States Patent
Henry et al.

(10) Patent No.: US 11,032,964 B2
(45) Date of Patent: Jun. 15, 2021

(54) FLOW SPLITTING CONTROL VALVE FOR SECONDARY HEADER

(71) Applicant: CNH Industrial Canada, Ltd., Saskatoon (CA)

(72) Inventors: James W. Henry, Saskatoon (CA); Scott D. Noble, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 421 days.

(21) Appl. No.: 16/019,989

(22) Filed: Jun. 27, 2018

(65) Prior Publication Data

US 2020/0000009 A1 Jan. 2, 2020

(51) Int. Cl.
*A01C 7/08* (2006.01)
*F16K 7/04* (2006.01)
*A01C 23/00* (2006.01)

(52) U.S. Cl.
CPC ............ *A01C 7/082* (2013.01); *A01C 23/008* (2013.01); *F16K 7/045* (2013.01)

(58) Field of Classification Search
CPC ......... A01C 7/082; A01C 7/084; A01C 7/081; A01C 7/08; A01C 23/008; F16K 7/045
See application file for complete search history.

(56) References Cited

U.S. PATENT DOCUMENTS

| | | | |
|---|---|---|---|
| 3,979,183 A | 9/1976 | Scott | |
| 4,327,759 A | 5/1982 | Millis | |
| 4,515,689 A | 5/1985 | Vivier | |
| 5,025,951 A | 6/1991 | Hook et al. | |
| 5,114,239 A | 5/1992 | Allen | |
| 5,242,404 A | 9/1993 | Conley et al. | |
| 5,338,284 A | 8/1994 | Knelson | |
| 5,354,268 A | 10/1994 | Peterson et al. | |
| 5,452,954 A | 9/1995 | Handke et al. | |
| 6,149,572 A | 11/2000 | Knelson | |
| 6,644,225 B2 | 11/2003 | Keaton | |
| 6,796,934 B1 | 9/2004 | McAlister et al. | |
| 6,871,660 B2 * | 3/2005 | Hampsch | F16K 31/465 137/1 |
| 7,101,120 B2 | 9/2006 | Jurkovich | |
| 7,810,674 B2 | 10/2010 | Belongia et al. | |
| 7,810,988 B2 | 10/2010 | Kamimura et al. | |
| 8,893,630 B2 | 11/2014 | Kowalchuk | |
| 9,295,191 B2 * | 3/2016 | Jagow | A01C 7/088 |
| 2001/0042712 A1 | 11/2001 | Battrell et al. | |

(Continued)

FOREIGN PATENT DOCUMENTS

CA 2979447 A1 * 3/2018 ............. A01B 49/06

*Primary Examiner* — Jamie L McGowan
(74) *Attorney, Agent, or Firm* — Rebecca L. Henkel; Rickard K. Demille

(57) ABSTRACT

An agricultural implement including a toolbar, a plurality of row units connected to the toolbar, and a pneumatic seeding system. The pneumatic seeding system includes at least one storage tank configured for storing the particulate matter, a plurality of fluid lines fluidly interconnecting the at least one storage tank with each row unit of the plurality of row units, a fan fluidly connected to the at least one storage tank and to the plurality of fluid lines, and at least one pinch valve fluidly coupled to at least one fluid line of the plurality of fluid lines for adjustably balancing a respective airstream within the at least one fluid line of the plurality of fluid lines.

10 Claims, 4 Drawing Sheets

(56) References Cited

U.S. PATENT DOCUMENTS

Figure 1:
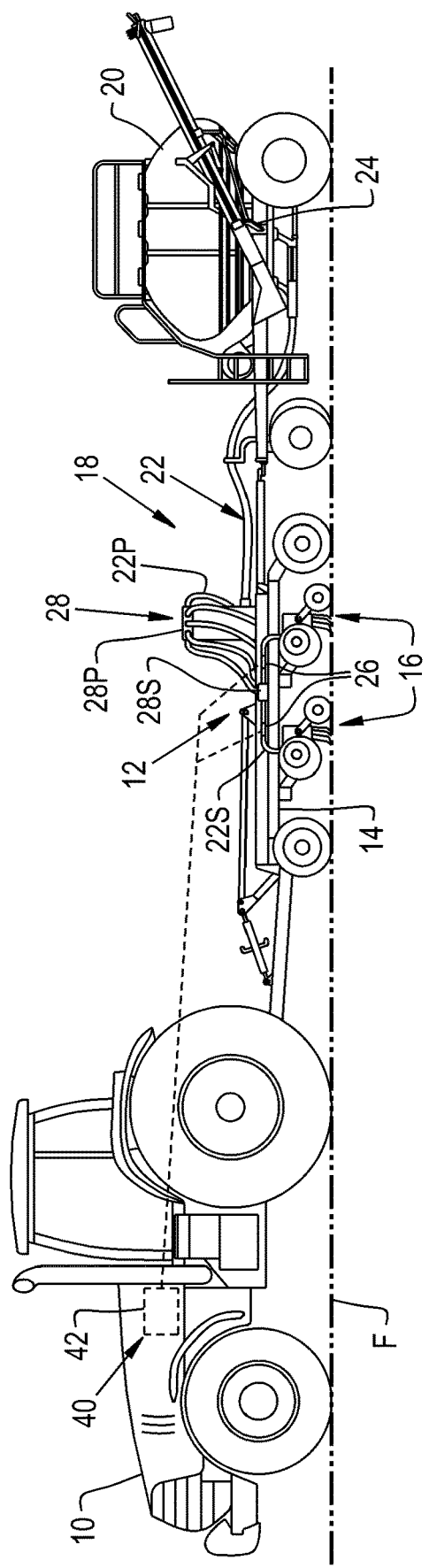

| | | | |
|---|---|---|---|
| 2007/0204914 A1 | 9/2007 | Kurosawa et al. | |
| 2015/0101518 A1* | 4/2015 | Arnold | A01C 21/00 111/174 |
| 2016/0330901 A1* | 11/2016 | Arnold | A01C 7/088 |
| 2018/0027726 A1* | 2/2018 | Snyder | A01C 7/082 |
| 2018/0317379 A1* | 11/2018 | Pirkenseer | A01C 7/088 |

* cited by examiner

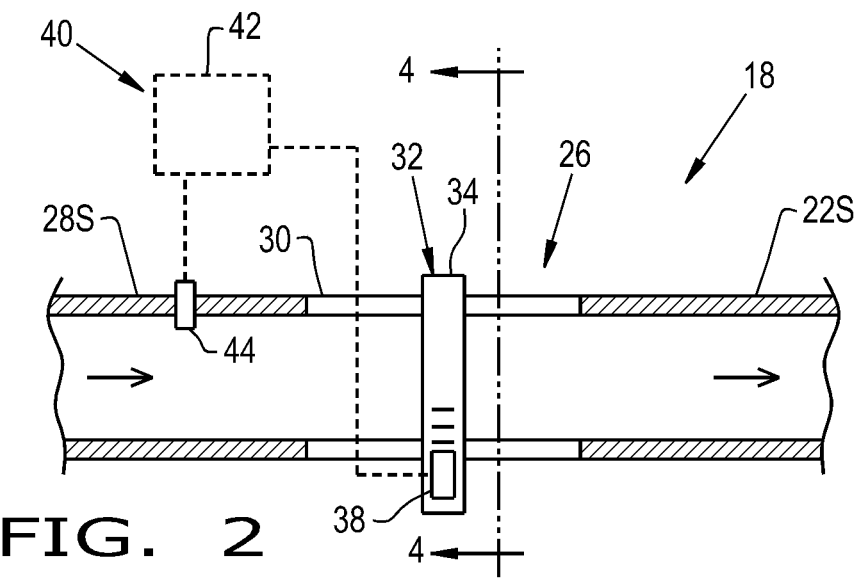
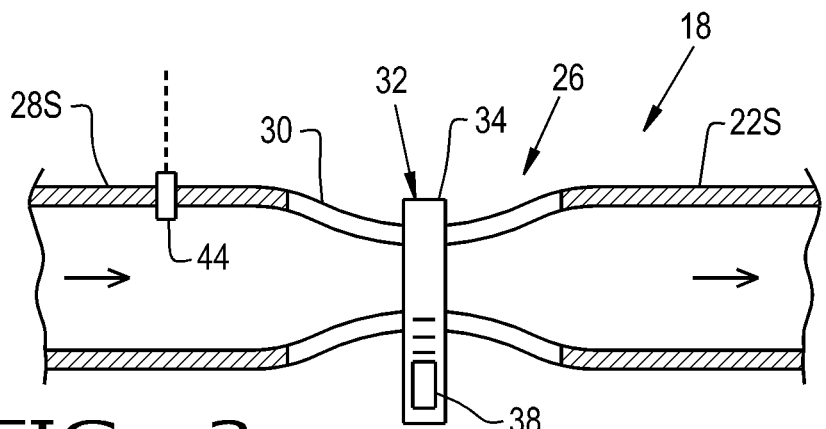
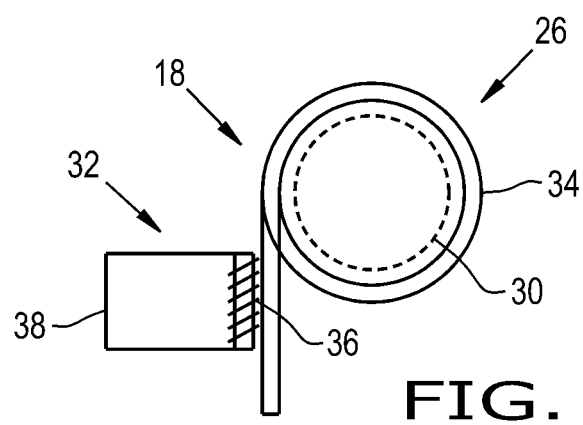

FLOW SPLITTING CONTROL VALVE FOR SECONDARY HEADER

FIELD OF THE INVENTION

The present invention pertains to agricultural implements and, more specifically, to agricultural seeders with fluid hoses for transporting particulate matter.

BACKGROUND OF THE INVENTION

Agricultural implements, such as planters, air seeders, or air drills, may be used to simultaneously plant multiple rows of crop material in a field in a uniform and consistent manner. Such implements typically include at least one storage tank, which stores particulate matter such as seed or fertilizer, a pneumatic seed metering system, and multiple row units for opening a trench in the field, depositing the seed in the trench, and closing the trench. The storage tank may be located on the seeding unit itself, as in some air drills, or located on a separate air cart that is either towed behind or in front of the seeder tool. In either configuration, the pneumatic seed metering system fluidly couples the storage tank to the row units so that seed or other particulate matter can be metered and transported in an airstream from the storage tank into the field. The pneumatic seed metering system generally includes a fan coupled to the storage tank and numerous fluid lines, e.g. hoses, interconnected between the storage tank and the row units. The row units may each include an auxiliary seed hopper, as in planters, a cutting disk or hoe for opening a trench in the field, a seed meter disk, a closing disk, and/or a packer roller to pack soil on top of the planted seed.

To increase the numbers of rows being planted, pneumatic seed metering systems of modern air seeders or drills typically have one or more primary fluid lines that are connected to the at least one storage tank and to multiple secondary fluid lines which then transport the seed or other particulate matter to each row unit. One type of air seeder uses a primary fluid line to transport the seed to a first hollow distributor or manifold that then divides the airstream into a number of secondary streams, which then couple to respective secondary headers. The secondary headers then further divide the airstream and transport the seed or other particulate matter to each row unit. Another type of air seeder uses a mechanical metering roller that is segmented into a number of respective subsections. Each subsection is fluidly connected to respective secondary headers that then further divide the airstream into individual airstreams associated with each row unit.

It is common for a single fan to provide the pressurized airstream across the various fluid lines of the pneumatic seed metering system. However, due to one fan servicing multiple fluid lines, the airstreams within the primary and/or secondary fluid lines may differ. For example, if one primary line is longer than another primary fluid line, then the two primary fluid lines will offer differing pressurized airstreams to their respective secondary fluid lines. The secondary header typically cannot compensate the air pressure within each individual secondary fluid line because the secondary header simply evenly splits the primary airstream among its various secondary fluid lines. To avoid pressure drops across the several secondary fluid lines, it is common to include fluid lines which all have the same length. However, this may lead to excessively long fluid lines for some row units which may then increase production costs and clutter the seeding unit.

What is needed in the art is a cost-effective seed metering system which individually controls the fluid pressure in each secondary fluid line.

SUMMARY OF THE INVENTION

In one exemplary embodiment formed in accordance with the present invention, there is provided a pneumatic seed metering system for an agricultural implement that includes mechanical, pneumatic, or hydraulic pinch valves which are fluidly coupled to at least one outlet of the primary and/or secondary header(s). The pinch valves include a flexible tubing, an adjustable constricting member, and an actuator for adjusting the level of constriction of the constricting member. The pinch valves restrict the airstream exiting from the outlet(s) and can balance the airstreams among the various fluid lines such that a substantially even air pressure is provided to each row unit. The pneumatic seed metering system may additionally include a controller operably coupled with the pinch valves and a sensor that is coupled to at least one outlet of the primary and/or secondary header(s). The controller can automatically (un)constrict the pinch valves for automatically adjusting one or more of the airstream(s) within the fluid lines.

In another exemplary embodiment formed in accordance with the present invention, there is provided an agricultural implement including a toolbar, a plurality of row units connected to the toolbar and configured for placing a particulate matter into a field, and a pneumatic seeding system associated with the toolbar and the plurality of row units. The pneumatic seeding system includes at least one storage tank configured for storing the particulate matter, a plurality of fluid lines fluidly interconnecting the at least one storage tank with each row unit of the plurality of row units, and a fan fluidly connected to the at least one storage tank and to the plurality of fluid lines. The fan being configured for providing an airstream through the plurality of fluid lines for carrying the particulate matter from the at least one storage tank to the plurality of row units. The pneumatic seeding system also includes at least one pinch valve fluidly coupled to at least one fluid line of the plurality of fluid lines for adjustably balancing a respective airstream within the at least one fluid line of the plurality of fluid lines.

In yet another exemplary embodiment formed in accordance with the present invention, there is provided a pneumatic seeding system for an agricultural implement including at least one storage tank configured for storing a particulate matter, a plurality of fluid lines fluidly connected to the at least one storage tank, and a fan fluidly connected to the at least one storage tank and to the plurality of fluid lines. The fan is configured for providing an airstream through the plurality of fluid lines for transporting the particulate matter in the airstream. The pneumatic seeding system also includes at least one pinch valve fluidly coupled to at least one fluid line of the plurality of fluid lines for adjustably balancing a respective airstream within the at least one fluid line of the plurality of fluid lines.

In yet another exemplary embodiment formed in accordance with the present invention, there is provided a method for depositing a particulate matter into a field. The method includes a step of providing a pneumatic seeding system. The pneumatic seeding system includes at least one storage tank configured for storing the particulate matter, a plurality of fluid lines fluidly connected to the at least one storage tank, and a fan fluidly connected to the at least one storage tank and to the plurality of fluid lines. The fan being configured for providing an airstream through the plurality of fluid lines for transporting the particulate matter in the airstream. The pneumatic seeding system also includes at least one pinch valve fluidly coupled to at least one fluid line of the plurality of fluid lines. The method also includes the steps of transporting the particulate matter in a respective airstream through the at least one fluid line of the plurality of fluid lines, and adjustably balancing, by the at least one pinch valve, the respective airstream within the at least one fluid line of the plurality of fluid lines.

One possible advantage of the exemplary embodiment of the agricultural implement is that the pneumatic seeding system of the present invention efficiently and automatically balances the individual airstreams within the air lines.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings:

FIG. 1 illustrates a side view of an exemplary embodiment of an agricultural implement, the agricultural implement including a pneumatic seeding system having at least one pinch valve, in accordance with an exemplary embodiment of the present invention;

FIG. 2 illustrates a side view of the at least one pinch valve of FIG. 1 in an open position, in accordance with an exemplary embodiment of the present invention;

FIG. 3 illustrates a side view of the at least one pinch valve of FIG. 1 in a constricted position, in accordance with an exemplary embodiment of the present invention;

FIG. 4 illustrates a cross-sectional view of the at least one pinch valve, taken across line 4-4 in FIG. 2, in accordance with an exemplary embodiment of the present invention;

FIG. 5 illustrates a schematic view of another embodiment of a pneumatic seeding system, in accordance with an exemplary embodiment of the present invention; and FIG. 6 illustrates a cross-sectional view of another embodiment of a pinch valve, in accordance with an exemplary embodiment of the present invention.

DETAILED DESCRIPTION OF THE INVENTION

Referring now to the drawings, and more particularly to FIG. 1, there is shown an agricultural vehicle 10, such as a tractor, towing an agricultural implement 12 through a field "F". The agricultural implement 12 may be in the form of any desired particulate matter dispensing implement such as a planter, an air seeder, or an air drill. As shown, the agricultural implement 12 is in the form of an air seeder 12 which deposits seed into the field F. The agricultural implement 12 may generally include a chassis with a toolbar 14, multiple row units 16 connected to the toolbar 14 placing the particulate matter, e.g. seed and/or fertilizer, into the field F, and a pneumatic seeding system 18 associated with the toolbar 14 and the row units 16. The row units 16 may be in the form of any desired row units. The pneumatic seeding system 18 generally includes at least one storage tank 20, multiple fluid lines 22, a blower or fan 24, and at least one pinch valve 26.

The storage tank(s) 20 may store the particulate matter, e.g. the seed to be planted and/or the fertilizer. The storage tank 20 may be in the form of an air cart 20 which can be towed behind or in front of the toolbar 14 carrying the row units 16. For example, the storage tank 20 may be a Precision Air® Cart which is commercially available from CNH Industrial, LLC. Alternatively, the storage tank 20 may be supported by the chassis of the agricultural implement 12 (not shown).

The multiple fluid lines 22 respectively interconnect the storage tank(s) 20 to each row unit 16. In more detail, the pneumatic seeding system 18 may include at least one header 28, such as at least one primary header 28P and at least one secondary header 28S; and thereby, the fluid lines 22 may include at least one primary fluid line 22P and at least two secondary fluid lines 22S associated with the primary and secondary headers 28P, 28S. More particularly, a single, large fluid line 22 may connect the storage tank 20 to the primary header 28P, and multiple primary fluid lines 22P may extend between the primary header 28P and the secondary header 28S. In this regard, the primary fluid lines 22P fluidly interconnect the storage tank 22 to the primary and secondary headers 28P. The secondary fluid lines 22S may then be coupled between the secondary header 28S and each individual row unit 16. It should be appreciated that each header 28P, 28S has at least two fluid outlets, for example two, four, six, or more fluid outlets. The multiple fluid lines 22 may be in the form of fluid hoses, such as air hoses 22.

The fan 24 is fluidly connected to the at least one storage tank 20 and to the fluid lines 22. The fan 24 provides a pressure differential, either positive or negative pressure, which then creates an airstream through the fluid lines 22. The airstream within each fluid line 22 then carries the particulate matter from the storage tank(s) 20 to the row units 16. The fan 24 may be in the form of any desired blower or vacuum fan 24. It should be appreciated that the agricultural implement 12 may include one or more fan(s) 24 for servicing the fluid lines 22.

Referring now collectively to FIGS. 1-4, the pinch valve(s) 26 can be fluidly connected to at least one fluid line 22 for adjustably balancing a respective airstream within the respective fluid line 22. As shown in FIG. 1, each pinch valve 26 is located in between a respective fluid outlet of the secondary header 28S and a respective secondary fluid line 22S. In other words, each pinch valve 26 is connected to an outlet of the secondary header 28S at one end and to the beginning of the secondary fluid line 22S at the other end. Each pinch valve 26 can include an elastomer tube 30 and an actuator 32 connected to the elastomer tube 30 (FIGS. 2-3). Each pinch valve 26 is configured for adjusting the airstream in the fluid lines 22 by adjusting a cross-sectional area through which the airstream passes.

The elastomer tube 30 has an inner diameter, defining a cross-sectional area, and can be fluidly coupled in between a respective primary or secondary fluid line 22P, 22S and a primary or secondary header 28P, 28S via known fasteners and/or adhesives. As shown, the elastomer tubes 30 are fluidly coupled to each outlet of the secondary headers 28S. The elastomer tube 30 can be composed of any desired, flexible material, such as a deformable rubber material.

The actuator 32 is configured for pinching the elastomer tube 30 for adjustably decreasing and/or increasing the inner diameter to either restrict or open the airflow through the elastomer tube 30, thereby adjusting the airstream within the respective primary or secondary fluid line 22P, 22S. The actuator 32 can pinch or otherwise alter the shape of the elastomer tube 30 to adjust the airflow therethrough. For instance, the actuator 32 can have an open position in which the elastomer tube 30 is not constricted (FIG. 2) and a closed position in which the actuator 32 alters the shape of at least a portion of the elastomer tube 30 to at least partially restrict the airflow through the elastomer tube 30 (FIG. 3). In an alternative embodiment the pinch valve(s) 26 may not include an elastomer tube 30 and thereby the actuator 32 may be directly coupled onto and constrict the fluid lines 22P, 22S or the outlets of the header 28P, 28S.

Each actuator 32 can include a constricting member 34 contacting the elastomer tube 30, a worm gear 36 operably connected to the constricting member 34, and a motor 38 connected to the worm gear 36 for selectively adjusting the worm gear 36 to tighten or loosen the constricting member 34 around the elastomer tube 30 (FIG. 4). The constricting member 34 can be in the form of an annular clamp 24, such as a commercially available hose clamp. The constricting member 34 can at least partially wrap around the elastomer tube 30 of the respective pinch valve 26. As shown, the constricting member 34 of the actuator 32 symmetrically constricts the elastomer tube 30, and thereby symmetrically decreases the cross-sectional area of the elastomer tube 30. However, the actuator 32 may unevenly pinch or squeeze the elastomer tube 30 from one side of the elastomer tube 30 such that cross-sectional area is unevenly reduced. The worm gear 36 can be in the form of any desired gear or device that can be actuated to tighten or loosen the constricting member 34. The motor 28 can be a hydraulic or an electric motor 38. Alternatively, the actuator 32 can be in the form of a plastic strap or clamp and/or a scissor-type pinching device which is coupled with the elastomer tube 30 (not shown). Further, in an alternative embodiment of the present invention, the actuator 32 may not be a mechanical actuator and may instead be pneumatically or hydraulically actuated (not shown).

In a further exemplary embodiment of the present invention, the pneumatic seeding system 18 of the agricultural implement 12 may further include a feedback control device 40 for automatically and adjustably constricting at least one of the pinch valves 26 (FIGS. 1-3). The feedback control device 40 may include a controller 42 operably coupled to each pinch valve 26 and a sensor 44 coupled to the respective pinch valve 26, primary or secondary fluid line 22P, 22S, and/or the outlet of the primary or secondary header 28P, 28S. As shown, each sensor 44 is operably coupled to each outlet of the secondary header 28S (FIGS. 2-3). The controller 42 is operably coupled to the sensor 42 and to the actuator 32 of each pinch valve 26.

In operation, the controller 42 can selectively constrict or open the pinch valve 26 based upon data received from the sensor 42. Thus, the controller 42 can vary the airstream, and thereby the product flow rates, among the different outlets of the secondary header 28S in order to ensure a particular air supply or product flow rate to each row unit 16, individually. For example, the controller 42 may balance each outlet of the secondary header 28S by substantially equalizing the product flow rates through each pinch valve 26. Hence, the controller 42 may open or constrict only one pinch valve 26 or two or more pinch valves 26 which are associated with a respective secondary header 28S. Additionally or alternatively, an operator can input a command into a user interface of the agricultural vehicle 10 which then prompts the controller 42 to adjust one or more of the pinch valves 26. In addition to the automatic control of the pinch valves 26 by the feedback control device 40, an operator can manually adjust the pinch valves 26 as desired.

The controller 42 can be incorporated into the control system of the agricultural vehicle 10, as shown, or the agricultural implement 12. The controller 42 may be in the form of any desired electronic control unit (ECU). The controller 42 may include software code or instructions which are tangibly stored on a tangible computer readable medium, e.g. a computer hard drive, an optical medium, solid-state memory, such as a flash memory, or other storage media known in the art. Thus, any of the functionality performed by the controller 42 described herein may be implemented in software code or instructions which are tangibly stored on the tangible computer readable medium. Each sensor 44 may be any desired sensor, such as an electrostatic, particle, or pressure sensor, which provides a signal to the controller 42.

Figure 5:
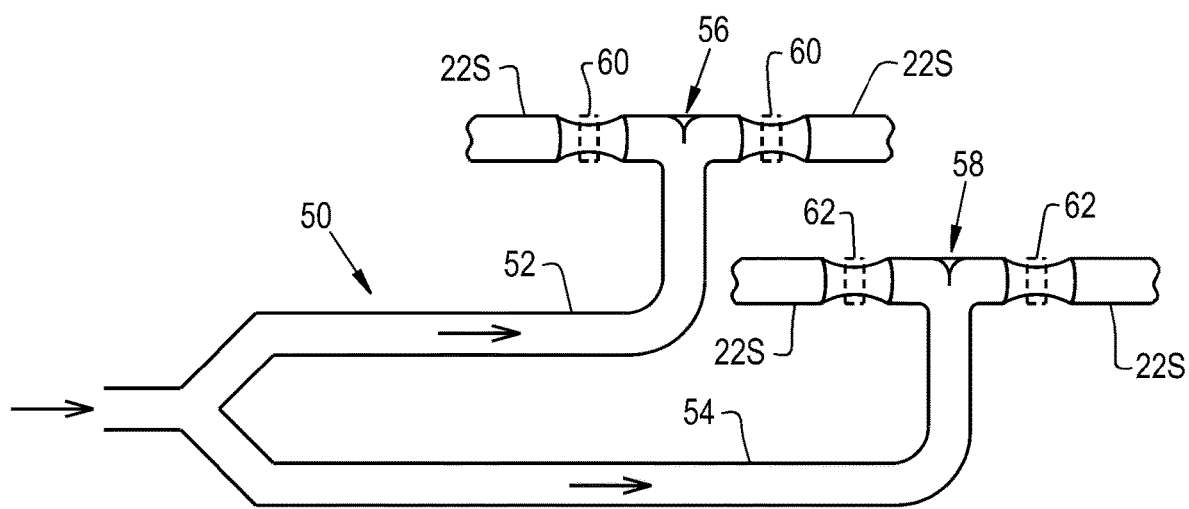

Referring now to FIG. 5, there is shown another embodiment of a pneumatic seeding system 50 which generally includes a first primary fluid line 52 and a second primary fluid line 54 which is longer than the first primary fluid line 52, a respective set of secondary fluid lines 22S, respective first and second headers or splitters 56, 58, and at least one pinch valve associated with each primary fluid line 52, 54, such as a first and second set of pinch valves 60, 62 respectively coupled with the first and second headers 56, 58. The pneumatic seeding system 50 may be substantially similar to the pneumatic seeding system 18. Thereby, the pneumatic seeding system 50 may further include the feedback control device 40 of the pneumatic seeding system 18, wherein the sensors 44 would then be coupled to the primary fluid lines 52, 54 and/or the secondary fluid lines 22S. The primary fluid lines 52, 54 may be in the form of the fluid lines 22P as discussed above and may fluidly interconnect the storage tank 20 to the headers 56, 58. The pinch valves 60, 62 may be in the form of the pinch valves 26 as discussed above. The secondary fluid lines 22S fluidly interconnect the headers 56, 58 to an individual row unit 16 (not shown in FIG. 5). The first pinch valve(s) 60 may constrict the airflow more than the second pinch valve(s) 62 in order to offset the pressure difference between the primary fluid lines 52, 54 due to the shorter length of the first primary fluid line 52. Thereby, the pneumatic seeding system can substantially equalize the airflow provided through the secondary fluid lines 28S.

Figure 6:
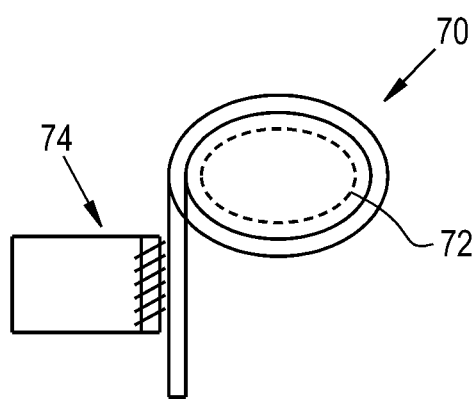

Referring now to FIG. 6, there is shown another embodiment of a pinch valve 70 which can be coupled with any one of the fluid lines 22 and/or headers 28 as discussed above. Each pinch valve 70 can include an elastomer tube 72 and an actuator 74 connected to the elastomer tube 72. Each pinch valve 70 is configured for adjusting the airstream in the fluid lines 22 by constricting the cross-sectional area through which the airstream passes. The actuator 74 may unevenly, e.g. unsymmetrically, deform the substantially circular elastomer tube 72. For example, the actuator 74 may pinch the elastomer tube 72 such that the elastomer tube 72 has an approximately oval cross-sectional shape. The elastomer tube 72 may be in the form of the elastomer tube 30 as discussed above. The actuator 74 can be in the form of the actuator 32, as discussed above, except that the constricting member (unnumbered) of the actuator 74 can flex accordingly to correspondingly follow the substantially oval shape. Alternatively, the actuator 74 can be in the form of a scissor-type actuator located on one side of the elastomer tube 72. Such a scissor-type actuator may include one or more elongate member(s) contacting the elastomer tube 72 and an electric motor for actuating the elongate member(s). For instance, a pair of elongate members can be pivotally connected to one another and the electric motor can actuate the elongate members so that the elongate members pinch the side of the elastomer tube 72 to subsequently create the substantially oval-shaped cross-section.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural implement, comprising:
   a toolbar;
   a plurality of row units connected to the toolbar and configured for placing a particulate matter into a field; and
   a pneumatic seeding system associated with the toolbar and the plurality of row units, the pneumatic seeding system including:
   at least one storage tank configured for storing the particulate matter;
   a plurality of fluid lines fluidly interconnecting the at least one storage tank with each row unit of the plurality of row units, wherein the plurality of fluid lines of the pneumatic seeding system includes at least one fluid line fluidly interconnecting the at least one storage tank and at least one primary header, and a plurality of primary fluid lines fluidly interconnecting the at least on primary header to a respective plurality of secondary headers;
   a fan fluidly connected to the at least one storage tank and to the plurality of fluid lines, the fan being configured for providing an airstream through the plurality of fluid lines for carrying the particulate matter from the at least one storage tank to the plurality of row units;
   at least one pinch valve fluidly coupled to each secondary header outlet of each of the plurality of secondary headers, the at least one pinch valve positioned between the secondary header outlet and a respective secondary fluid line which extends therefrom to the respective row unit; and
   a sensor positioned between each secondary header and the at least one pinch valve for adjustably balancing a respective airstream within each secondary fluid line.

2. The agricultural implement of claim 1, wherein the at least one pinch valve includes an elastomer tube with an inner diameter and an actuator connected to the elastomer tube, and the actuator is configured for pinching the elastomer tube for adjustably decreasing the inner diameter and constricting an airflow through the elastomer tube.

3. The agricultural implement of claim 2, wherein the actuator of the at least one pinch valve includes a constricting member contacting the elastomer tube, a worm gear operably connected to the constricting member, and a motor connected to the worm gear and configured for selectively adjusting the worm gear to adjustably constrict the elastomer tube.

4. The agricultural implement of claim 3, wherein the constricting member of the actuator is in the form of an annular clamp at least partially wrapping around the elastomer tube of the at least one pinch valve.

5. The agricultural implement of claim 1, further including a feedback control device including a controller operably coupled to the at least one pinch valve and the sensor associated therewith, the controller configured to adjustably constrict the at least one pinch valve based on data from the sensor.

6. A pneumatic seeding system for an agricultural implement, comprising:
   at least one storage tank configured for storing a particulate matter;
   a plurality of fluid lines fluidly connected to the at least one storage tank, wherein the plurality of fluid lines of the pneumatic seeding system includes at least one fluid line fluidly interconnecting the at least one storage tank and at least one primary header, and a plurality of primary fluid lines interconnecting the at least one primary header to a respective plurality of secondary headers;
   a fan fluidly connected to the at least one storage tank and to the plurality of fluid lines, the fan being configured for providing an airstream through the plurality of fluid lines for transporting the particulate matter in the airstream; and
   at least one pinch valve fluidly coupled to each secondary header outlet of each of the plurality of secondary headers, the at least one pinch valve positioned between the secondary header outlet and a respective secondary fluid line which extends therefrom to a row unit; and
   a sensor positioned between each secondary header and the at least one pinch valve for adjustably balancing a respective airstream within each secondary fluid line.

7. The pneumatic seeding system of claim 6, wherein the at least one pinch valve includes an elastomer tube with an inner diameter and an actuator connected to the elastomer tube, and the actuator is configured for pinching the elastomer tube for adjustably decreasing the inner diameter and constricting an airflow through the elastomer tube.

8. The pneumatic seeding system of claim 7, wherein the actuator of the at least one pinch valve includes a constricting member contacting the elastomer tube, a worm gear operably connected to the constricting member, and a motor connected to the worm gear and configured for selectively adjusting the worm gear to adjustably constrict the elastomer tube.

9. The pneumatic seeding system of claim 8, wherein the constricting member of the actuator is in the form of an annular clamp at least partially wrapping around the elastomer tube of the at least one pinch valve.

10. The pneumatic seeding system of claim 6, further including a feedback control device including a controller operably coupled to the at least one pinch valve and the sensor associated therewith, and the controller configured to adjustably constrict on the at least one pinch valve based on data from the sensor.

* * * * *